Patented June 19, 1945

2,378,519

UNITED STATES PATENT OFFICE 2,378,519

PROCESSING OF SYNTHETIC ELASTOMERS

John R. Vincent, Wilmington, Del., assignor to E. I. du Pont de Nemours & Company, Wilmington, Del., a corporation of Delaware No Drawing. Application October 2, 1943, Serial No. 504,761

13 Claims. (Cl. 260—85.5)

This invention relates to the processing of synthetic elastomers, and more particularly to a method for improving the processing characteritics of synthetic elastomers made by polymerizing mixtures of butadiene and styrene. These butadiene-styrene products, which are commonly known as butadiene-styrene interpolymers, when made under the war time synthetic rubber program from approximately three parts of butadiene and one part of styrene, are generally known as GR–S, and for convenience and accuracy in referring to the materials employed in illustrating this invention, this designation will be employed where specifically applicable.

One of the chief problems confronting those attempting to replace rubber with synthetic elastomers is the processing of these synthetic products on rubber equipment. The elastomers such as GR–S do not break down during the mechanical working as readily as rubber, with the result that it is much more difficult to introduce into the synthetic products the necessary compounding ingredients.

While a number of substances have been proposed as softeners and plasticizers for natural and synthetic rubbers, most of the heretofore used substances, when applied to the interpolymers of butadiene and styrene, do not give the desired improvement in milling and processing characteristics, even though there may be an improvement in the plasticity of the product. (As illustrated below, plasticity in the case of butadiene-styrene interpolymers cannot be correlated with millability, although it is employed in the field of natural rubber to give a quantitative measure of millability.)

It is an object of this invention to provide a method for improving the processing characteristics of interpolymers of butadiene and styrene whereby they can be milled, compounded, extruded, molded or otherwise operated upon prior to vulcanization with greater ease than heretofore possible. A further object is to produce butadiene-styrene polymers having improved processibility whereby its use is materially enlarged, and whereby it can be employed more expeditiously than the products heretofore obtained.

I have found that, by the addition of from 0.05% to 5% of the zinc salt of an aromatic mercaptan of the benzene or naphthalene series to the unvulcanized interpolymers of butadiene and styrene, a synthetic elastomer is obtained with greatly improved processing characteristics and which can therefore be milled, compounded, etc., in less time than required for similar treatment of the untreated interpolymer. Such products can therefore be extruded, molded or otherwise treated much more readily than similar untreated stock.

Although the use of aromatic mercaptans as such for the plasticizing of butadiene interpolymers is known, it has been found that the use of such mercaptans with the butadiene-styrene interpolymer only slightly improves, and in some cases actually decreases, the processibility of such interpolymers. It was therefore surprising to find that the zinc salts of the benzene and naphthalene series would impart to such elastomers greatly improved processing characteristics, particularly when added in such small amounts as I have found operate for this purpose.

Typical of the zinc salts which I have found to operate is zinc thioalphanaphtholate, the effect of which on the millability of different lots of GR–S made by various manufacturers and employed in varying amounts, is shown in the following table. In this table the decrease in milling time caused by the incorporation of the zinc salt is taken as the measure of improved millability (the determination of the milling time is described below).

| GR-S from manufacturer | Lot | Parts per 100 parts GR-S, percent | Percent decrease in milling time |
|---|---|---|---|
| B | 3 | 4.0 | 58 |
| B | 4 | 4.0 | 72 |
| B | 1 | 4.0 | 42 |
| B | 2 | 4.0 | 25 |
| B | 1 | 4.0 | 98 |
| C | 1 | 2.0 | 68 |
| C | 1 | 1.0 | 45 |
| C | 1 | 0.5 | 38 |
| C | 1 | 4.0 | 78 |
| D | 1 | 3.0 | 74 |
| D | 1 | 2.0 | 70 |
| D | 1 | 1.0 | 50 |
| A | 3 | 4.0 | 55 |

The milling time as reported in this table and elsewhere in this memorandum is determined as follows:

A 50 gram sample of the elastomer is placed on a laboratory mill (having rolls 6 inches long and 2 inches in diameter, both running at the same speed) which is kept at 70° C., and which has a roll separation of 0.030 inch. The band of elastomer on the mill roll is cut a definite number of times at stated intervals of time, to insure thorough mixing, for example, it is often convenient to cut the band four times each way at 5 minute intervals during the test. The milling is continued until the band is free of holes for at least the time required for one revolution of the front mill roll. The time elapsing between the start of milling and the development of a band free of holes is taken as a measure of millability. When a chemical agent is to be tested as a processing improver, such agent is added immediately after the elastomer is put on the mill, and addition is accomplished as quickly as possible. The conditions of this test differ from actual plant conditions only in the size of equipment used.

Throughout the rubber industry it has been common practice to use the plasticity of a rubber stock as a measure of its millability or processability. When applied to rubber this was a satisfactory laboratory method of determining millability. With certain synthetic elastomers, however, the situation is quite different, as there appears to be little if any correlation between plasticity and millability. For example, a sample of a butadiene-styrene interploymer known commercially as GR-S was worked for 30 minutes in a cold internal mixer, after which it milled very poorly, giving a lace-like band on a cold rubber mill. An identical sample worked for 8 hours in the same internal mixer was almost perfect in milling, producing a smooth continuous band at any mill temperature between 25° and 135° C., on the first pass through the mill rolls. The plasticities of these two samples were determined, using the Williams' Pendulum Pastometer [Williams, Ind. Eng. Chem 8, 304 (1936)] with the following results:

| Working time | Plasticity |
|---|---|
| 30 minutes | 39.6 |
| 8 hours | 38.7 |

This data is given to show that as to this type of elastomer there is no correlation between plasticity and processability, for the two samples are markedly different in the processing characteristics although they are very nearly identical in plasticity.

Because of this lack of correlation between plasticity and working time in GR-S it was necessary to develop the new laboratory test described above so as to have available a ready method of determining the processability of butadiene-styrene elastomers.

The zinc salts may be added on the mill to the already coagulated elastomer, as illustrated above, or it may be added to the elastomer latex before coagulation as illustrated by the following: To 100 parts of a 35% latex prepared by the emulsion polymerization of butadiene (75%) and styrene (25%) are added one part of zinc thioalphanaphtholate in the form of an aqueous slurry or dispersion. The mixture is heated at 80° C. for two hours and then coagulated with brine and acetic acid. The coagulum is extruded through a die with 1/16 inch holes, and dried at 120° C. for 15 minutes. The milling test on this sample when run as described above except that a temperature of 35° C. is used instead of 70° C., gave a 36% reduction in milling time compared to an untreated control of the same polymer not treated with the zinc thioalphanaphtholate.

Unlike the zinc salts, the corresponding free mercaptans when added to the massive elastomer cause little improvement, and in some cases actually decrease the processabiilty of GR-S. For example, 4% of thioalphanaphthol increased the milling time of a sample of lot 3 from manufacturer B by 5.0%, as compared to a decrease of 58% for 4.0% of zinc thioalphanaphtholate.

The zinc salts of other compounds of this class have also been found to be effective in improving the processing of butadiene-styrene polymers. Thus, the use of zinc thiobetanaphtholate improves the millability of various samples of GR-S as shown in the following table:

| GR-S from manufacturer | Lot | Parts per 100 parts GR-S | Percent decrease in milling time |
|---|---|---|---|
| B | 2 | 4 | 22 |
| D | 1 | 4 | 72 |
| D | 1 | 3 | 72 |
| D | 1 | 2 | 62 |
| D | 1 | 1 | 44 |
| A | 4 | 4 | 52 |

Zinc thiobetanaphtholate compared to thiobetanaphthol, again shows the marked superiority of the zinc salts over the free mercaptans when added to the massive elastomer. For example, 4% of thiobetanaphthol reduces the milling time of lot 4 from manufacturer A by only 5%, while zinc thiobetanaphtholate reduces it by 52%.

The corresponding data for zinc xylyl-mercaptide is listed below:

| GR-S from manufacturer | Lot | Parts per 100 parts GR-S | Percent decrease in milling time |
|---|---|---|---|
| D | 1 | 4 | 76 |
| D | 1 | 3 | 71 |
| D | 1 | 2 | 64 |
| D | 1 | 1 | 50 |
| A | 4 | 4 | 44 |

The milling time of a sample of Hycar OS 10 (a butadiene-styrene poymer) is reduced by 87% when 4% of zinc xylyl-mercaptide is added thereto.

Where 2% of the zinc xylyl-mercaptide was incorporated with GR-S (manufacturer C, lot 2) on a 30 inch rubber mill, a 50% reduction in the time required for break-down was experienced enced when compared with the control worked on the same mill but without the addition of 2% zinc xylyl-mercaptide. The presence of the 2% zinc xylyl-mercaptide also resulted in 35% reduction in the time required to incorporate in the GR-S 50 parts of Channel Black, and the resulting stock possessed better extrudability than the control. When both stocks were vulcanized with the common GR-S accelerators there was no significant difference in the stress-strain properties of the two stocks, which makes it possible to use the treated stocks in the same manner as other stocks which have not been so treated.

The zinc xylyl-mercaptide employed in these preparations was prepared from a commercial grade of xylene mercaptan consisting of approximately 85% of metaxylene mercaptan, the remainder being the ortho and para isomers.

The use of zinc thiophenolate gives the following results:

| GR-S from manufacturer | Lot | Parts per 100 parts GR-S | Percent decrease in milling time |
|---|---|---|---|
| D | 1 | 4 | 76 |
| D | 1 | 3 | 78 |
| D | 1 | 2 | 60 |
| D | 1 | 1 | 47 |

The above tables show the unexpected effect on the millability of butadiene-styrene interpolymers produced by the addition of comparatively small amounts of a zinc salt of aromatic mercaptans. These salts may be employed for the purpose of this invention in amounts between 0.05% and 5%, based on the elastomer, although from 0.5% to 4% is the preferred range from an economical viewpoint and for satisfactory operation.

Any of the usual methods used for the incorporation of solids into elastomers may be used for introducing the zinc salts in the present invention. Thus they may be added on either a hot or cold mill or in either a hot or a cold internal mixer, or, when the elastomer is in latex form, by mixing as an aqueous dispersion before coagulation. Any of these operations results in a plastic mass into which compounding ingredients may be introduced with comparative ease.

The zinc salt of any of the mono or dicyclic aromatic mercaptans that are substituted only by alkyl and aryl groups may be used to improve the processing of butadiene-styrene interpolymers. Zinc salts of the thionaphthols and of xylyl mercaptan are preferred. The invention is applicable to any of the rubber-like interpolymers of butadiene and styrene containing from about 5% to about 50% of the latter.

I claim:

1. The process for improving the processing characteristics of butadiene-styrene elastomers, which comprises intimately incorporating with said elastomer by a mixing operation from 0.05% to 5% by weight of a zinc salt of an aromatic mercaptan of the benzene and naphthalene series, based on the weight of the elastomer.

2. The process for improving the processing characteristics of butadiene-styrene elastomers, which comprises intimately incorporating with said elastomer during the milling operation from 0.05% to 5% by weight of a zinc salt of an aromatic mercaptan of the benzene and naphthalene series, based on the weight of the elastomer.

3. The process for improving the processing characteristics of butadiene-styrene elastomers, which comprises intimately incorporating with said elastomer by a mixing operation from 0.05% to 5% by weight of a zinc salt of a thionaphthol, based on the weight of the elastomer.

4. The process for improving the processing characteristics of butadiene-styrene elastomers, which comprises intimately incorporating with said elastomer by a mixing operation from 0.05% to 5% by weight of a zinc salt of a thioalphanaphthol, based on the weight of the elastomer.

5. The process for improving the processing characteristics of butadiene-styrene elastomers, which comprises intimately incorporating with said elastomer by a mixing operation from 0.05% to 5% by weight of a zinc salt of a thiophenol, based on the weight of the elastomer.

6. The process for improving the processing characteristics of butadiene-styrene elastomers, which comprises intimately incorporating with said elastomer by a mixing operation from 0.05% to 5% by weight of a zinc salt of a phenyl mercaptan.

7. The process for improving the processing characteristics of butadiene-styrene elastomers, which comprises intimately incorporating with said elastomer by a mixing operation from 0.05% to 5% by weight of the zinc salt of a xylyl mercaptan, based on the weight of the elastomer.

8. An unvulcanized butadiene-styrene elastomer having incorporated therein from 0.05% to 5% by weight of a zinc salt of an aromatic mercaptan of the benzene and naphthalene series.

9. An unvulcanized butadiene-styrene elastomer having incorporated therein from 0.05% to 5% by weight of a zinc salt of a thionaphthol.

10. An unvulcanized butadiene-styrene elastomer having incorporated therein from 0.05% to 5% by weight of a zinc salt of a thiophenol.

11. An unvulcanized butadiene-styrene elastomer having incorporated therein from 0.05% to 5% by weight of a zinc salt of a xylyl mercaptan.

12. An unvulcanized butadiene-styrene elastomer having incorporated therein from 0.05% to 5% by weight of a zinc salt of a thioalphanaphthol.

13. An unvulcanized butadiene-styrene elastomer having incorporated therein from 0.05% to 5% by weight of a zinc salt of a phenyl mercaptan.

JOHN R. VINCENT.